UNITED STATES PATENT OFFICE.

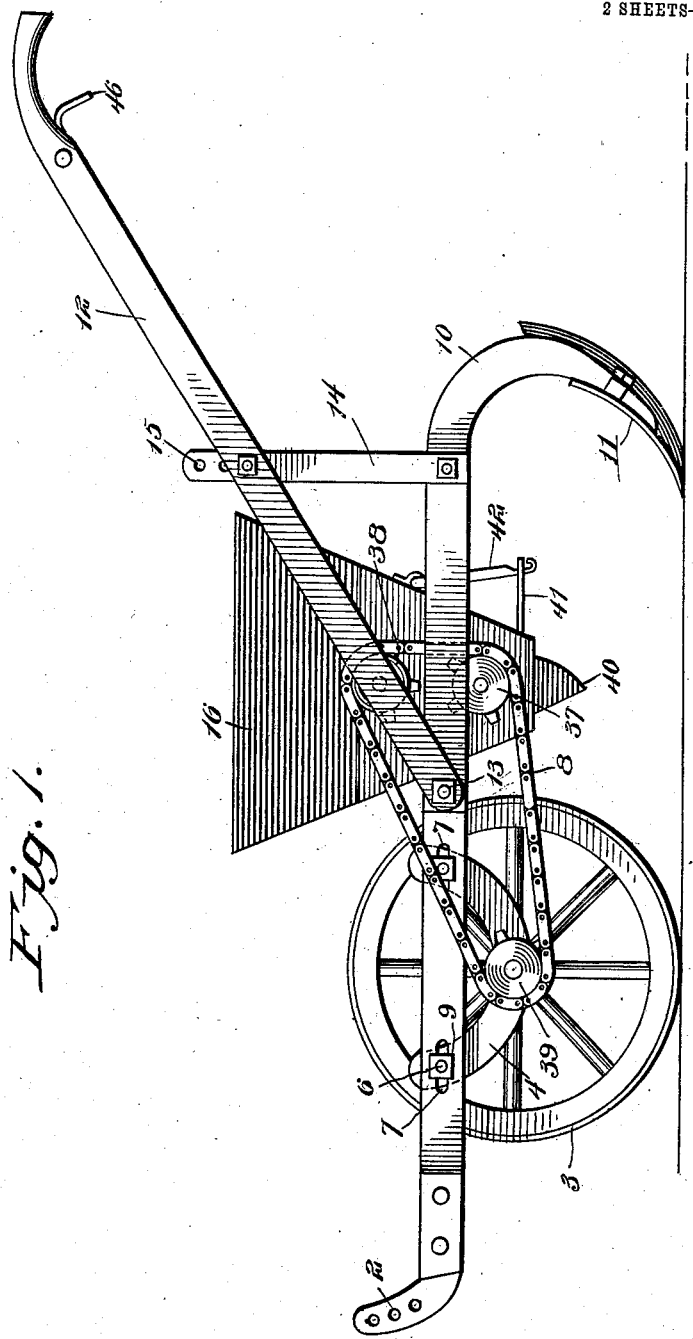

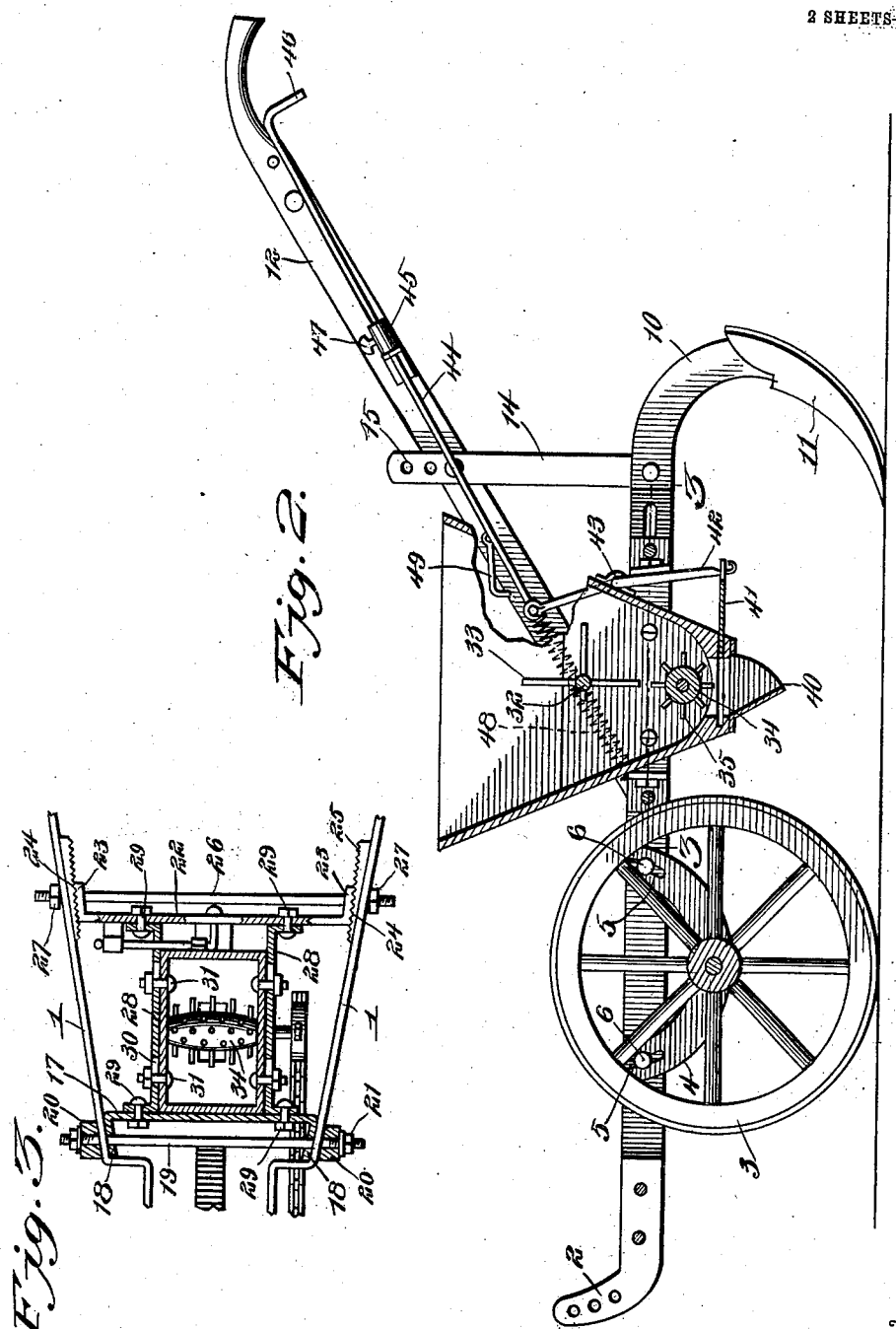

JOHN B. CORSBIE, OF JULIAN, NORTH CAROLINA.

COMBINED FERTILIZER-DISTRIBUTER AND PLOW.

No. 840,437.  Specification of Letters Patent.  Patented Jan. 1, 1907.

Application filed August 8, 1906. Serial No. 329,782.

*To all whom it may concern:*

Be it known that I, JOHN B. CORSBIE, a citizen of the United States, residing at Julian, in the county of Guilford and State of North Carolina, have invented new and useful Improvements in a Combined Fertilizer-Distributer and Plow, of which the following is a specification.

This invention relates to a combined fertilizer-distributer and plow; and one of the principal objects of the same is to provide means for regulating the quantity of fertilizer to be distributed and to provide means for laterally adjusting the plows or shovels to form a ridge of the required width between the furrows.

Another object of the invention is to provide simple, reliable, and efficient means for adjusting the depth of the furrow and to provide means for regulating and cutting off the feed of the fertilizer material.

These and other objects are attained by means of the construction illustrated in the accompanying drawings, in which—

Figure 1 is a side elevation of a combined implement made in accordance with my invention. Fig. 2 is a longitudinal section through the feed-hopper and showing the inner side of one of the beams and handles.
Fig. 3 is a longitudinal sectional view through the beams and hopper on the line 3 3 of Fig. 2.

Referring to the accompanying drawings for a more particular description of my invention, the numerals 1 designate the two beams of the plow or ridger, said beams converging at their front ends and having a clevis 2, secured between the terminal ends of said beams. A ground-wheel 3 is journaled to yokes 4, and the upper ends of said yokes are slotted, as at 5, for vertical adjustment upon the bolts 6, which pass through the slots and through openings in the beams. Slots 7, extending longitudinally of the beams, are provided for the longitudinal adjustment of said wheel to tighten the drive-chain 8 when certain adjustments, to be hereinafter described, are effected. The bolts 6 pass through the slots 7 in the beams and are provided with adjusting-nuts 9. Secured to the downwardly-bent ends 10 of the beams are the plows or shovels 11. Handles 12 are adjustably bolted to the beams, as at 13, and rising from the beams are the uprights 14, provided with a series of apertures 15 for vertically adjusting the handles 12 to the required height for the operator. Supported between the beams is a hopper 16, connected to a frame composed of a laterally-disposed bar 17, having forwardly-bent ends 18, supported upon a transverse rod 19, passing through the ends 18 of the bar and through the beams 1, said rod 19 having fitted to its outer ends washers 20 and nuts 21, as shown more particularly in Fig. 3. A similar transverse bar 22 is provided at the rear side of the hopper, said bar having rearwardly-bent ends 23, provided with serrations 24 to engage serrated wedges 25 to provide for a lateral adjustment of the beams 1 and the plows 11, a transverse-rod 26 extending through the beams and is provided with nuts 27 for holding the said beams in adjusted positions. Longitudinally-disposed bars 28 are connected at opposite ends to the bars 17 and 22 by means of bolts 29. The bars 28 are provided with slots 30, and bolts 31 pass through said slots and through the hopper 16 to provide means whereby the hopper may be moved to compensate for the lateral adjustment of the beam 1, as will be understood.

Within the hopper 16 an agitator is mounted to rotate, said agitator comprising a shaft 32, having agitator-arms 33, secured thereto. A feeding device 34, consisting of a roller armed with radially-projecting pins 35, is mounted to rotate within the hopper immediately above the feed-opening in the bottom thereof. Sprocket-wheels 37 and 38 are secured to the agitator-shaft and the shaft of the feeding device, and the chain 8 passes around said sprocket-wheels and around the sprocket-wheels 39 on the ground-wheel shaft. A spout 40 projects downward and rearward from the lower end of the feed-opening in the hopper, and a sliding cover 41 is connected to the lower end of a crank-rod 42, journaled at 43 to the front side of the hopper, the upper end of said crank being connected to a sliding rod 44, which passes through a keeper 45 on one of the handles 12, the end of said rod 44 being bent downward, as at 46, and said rod being adjustably held to the keeper 45 by means of a set-screw 47 to regulate the size of the feed-opening at the bottom of the hopper. A spring 48 is secured at one end to the crank-rod 42, and the opposite end of the said spring is secured to the beam, the tension of said spring being exerted to draw the rod 44 downward to hold the slide 41 in open position. A hook 49, pivoted to one of the handles 12, is designed to engage the crank-rod 42 to hold the slide 41 closed whenever it is desired to move the machine from place to place.

From the foregoing the operation of my device will be understood. The beams may be laterally adjusted by means of wedges 25. The feed-opening may be regulated by means of the slide 41, while the ground-wheel and the handles are adjustable, as previously described.

Having thus described the invention, I claim—

1. In a combined fertilizer-distributer and plow, a hopper, an agitator mounted to rotate therein, a feeding device mounted to rotate therein, said hopper provided with a feed-opening, means for regulating the size of the opening, plow-beams adjustable laterally, a ground-wheel adjustable relatively to said beam, and handles secured to said beams, substantially as described.

2. In an implement of the character described, a hopper, an agitator journaled therein, a feeding device in said hopper, a feed-opening in said hopper, a slide for regulating the size of said feed-opening, a crank-rod connected to said slide, a sliding rod connected to said crank-rod, means for holding said sliding rod in adjusted position, a spring connected to said rod and to the frame of the machine for holding said feed-slide in one position, and a hook for holding said slide in another position.

3. In an implement of the character described, a hopper, means for adjusting said hopper longitudinally, beams, plows secured to said beams, and means for adjusting said beams and plows laterally, substantially as described.

4. In an implement of the character described, a ground-wheel, a pair of plow-beams, yokes to which said wheel is journaled, said yokes being slotted to provide vertical adjustment of said ground-wheel, and said beams being longitudinally slotted to provide for adjustment lengthwise of the beams, substantially as described.

5. In an implement of the character described, the combination of a hopper for feeding fertilizer, a pair of beams carrying plows, serrated wedges for laterally adjusting said beams, and means for regulating the feed of the fertilizer, substantially as described.

In testimony whereof I affix my signature in presence of two witnesses.

JOHN B. CORSBIE.

Witnesses:
  B. E. JONES,
  L. A. CARMAN.